J. HARDING.
Rein Holder.

No. 98,492. Patented June 4, 1870.

Witnesses
Clark Stevens
J. T. Lobdell

Inventor
Jones Y. Harding

United States Patent Office.

JONES HARDING, OF DETROIT, MICHIGAN.

Letters Patent No. 98,492, dated January 4, 1870.

IMPROVEMENT IN REIN-HOLDERS.

The Schedule referred to in these Letters Patent and making part of the same.

*To whom it may concern:*

Be it known that I, JONES HARDING, of the city of Detroit, in the county of Wayne, and State of Michigan, have invented a new and improved Mode of Securing or Holding Lines of teams while standing, to prevent them from moving forward, or the lines from getting down under foot. A description of the invention is as follows:

In the drawing—

Figure 1:
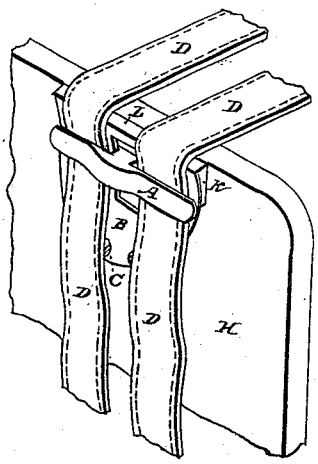
Figure 1 is a perspective view, as it appears on the dash or end-board with the lines attached.
Figure 2:
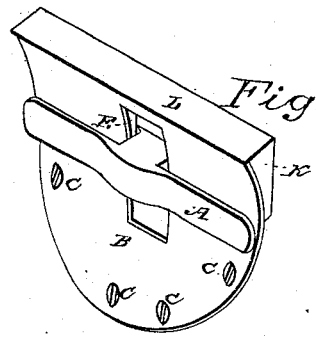
Figure 2 is the face-plate, of suitable size, D-shaped, or otherwise, in its circumference, with a concave face, and a slot, extending from the centre upward, sufficient to receive the square part of the slide-bar, and admit its movements.
Figure 3:
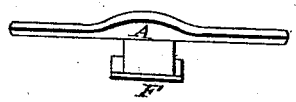

Figure 3 is the slide-bar, reaching across the face-plate, parallel with the straight or upper side of said plate, about midway thereof having a square projection, which fits in said slot, and is capped with a square plate or piece, on the bottom, to retain the projection within the slot, and, being somewhat longer, it takes bearing upon guides on each side of the slot, thereby guiding the movements of the slide-bar up and down. Said slide-bar is corrugated upon the inner side.

The movement is as follows:

The slide-bar, resting at the bottom of the slot, stands out from the face-plate sufficiently to receive the lines, which come back from the team over the dash or end-board, thence under or between the slide-bar and face-plate. Now, by moving said bar upward, it nears the face-plate, until said lines are rendered immovable by a forward draught or movement, and thereby made secure.

Figure 4:

Figure 4 is an end view of slide-bar and its members.

Figure 5:
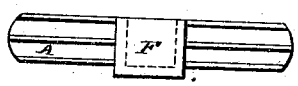

Figure 5 is the under or inner side of the slide-bar, which is corrugated.

Figure 6:
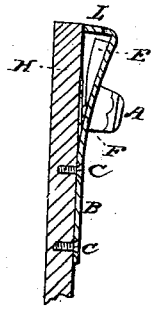

Figure 6 is an end view of the fastener, as it appears on the dash or end-board.

Having fully described my invention,

What I claim as new, and desire to secure by Letters Patent, is—

A line-fastener, made of any suitable material, and consisting of the concave face-plate B and corrugated slide-bar A, with its projections and bearings, substantially as herein shown and described.

JONES HARDING.

Witnesses:
CLARK STEVENS,
J. F. LOBDELL.